J. G. & W. C. HELMCHEN.
FLANK STRETCHER AND FORMER.
APPLICATION FILED MAY 26, 1917.

1,232,920.

Patented July 10, 1917.

Inventors:
John Gottlieb Helmchen
Walter C. Helmchen
Att'ys.

UNITED STATES PATENT OFFICE.

JOHN GOTTLIEB HELMCHEN AND WALTER C. HELMCHEN, OF CHICAGO, ILLINOIS.

FLANK STRETCHER AND FORMER.

1,232,920.          Specification of Letters Patent.          Patented July 10, 1917.

Application filed May 26, 1917. Serial No. 171,266.

*To all whom it may concern:*

Be it known that we, JOHN GOTTLIEB HELMCHEN and WALTER C. HELMCHEN, citizens of the United States, and residents of Chicago, county of Cook, and State of Illinois, have jointly invented certain new and useful Improvements in Flank Stretchers and Formers, of which the following is a specification, and which are illustrated in the accompanying drawings, forming a part thereof.

The invention relates to a device for use in connection with the slaughter of hogs. It is the common practice in packing establishments to split the carcass down the back and suspend each half by the hind leg during the cooling process. The weight of the meat stretches the flank portion and tends to cause it to wrinkle longitudinally. When the cooling process is completed these wrinkles become set and are difficult to eradicate. The flank is cut into flitches of bacon and the rind should be smooth in order to render the goods marketable. The presence of wrinkles is therefore decidedly objectionable and frequently results in waste.

This invention consists in a stretcher and former adapted to be inserted within each side to hold the flank in its natural form and prevent wrinkling during the cooling process and it consists of a structure such as is hereinafter described and as illustrated in the accompanying drawings in which—

Figure 1:
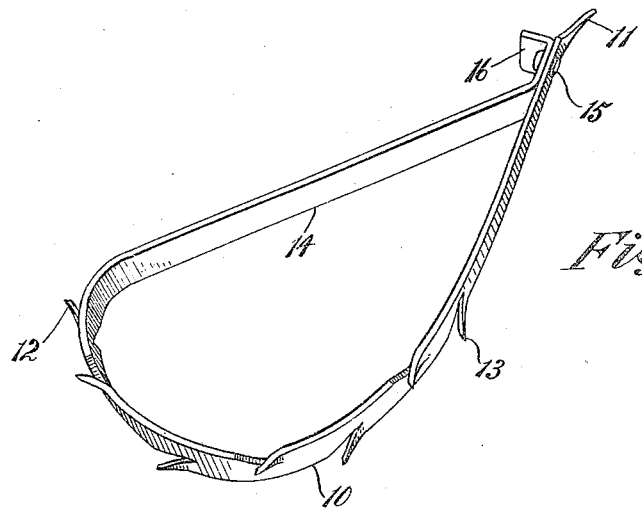
Figure 1 is a view in perspective of the device.
Figure 3:
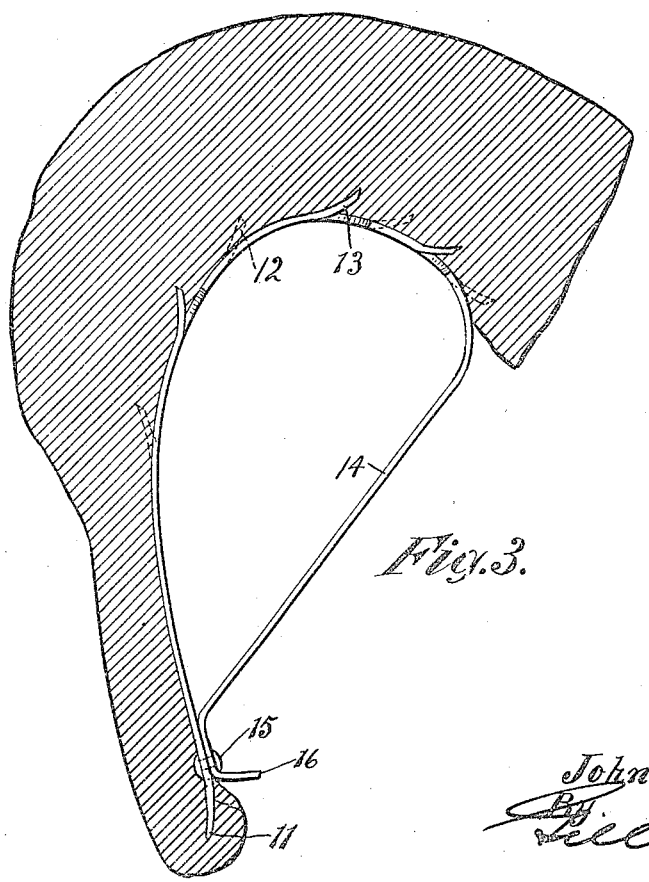
Fig. 3 is a sectional view on the line 3—3 of Fig. 2.
Figure 2:
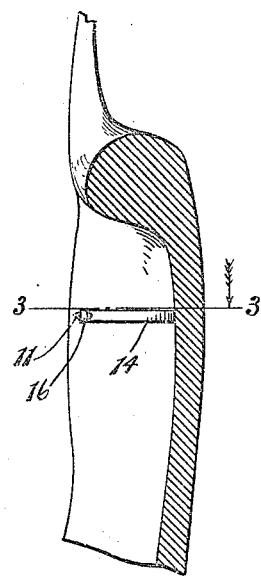
Fig. 2 is a representation of the half of an animal with the stretcher and former applied thereto.

The stretcher and former may be made of any suitable material such as metal or wood. Preferably a piece of strap steel is employed and is bent to bowed form as shown at 10, the curvature being approximately that of the inner surface of the carcass to which it is to be applied. The outer end of the bowed portion is pointed as shown at 11 in order to be inserted into the flesh, and barbs as 12, 13, as many being employed as may be desirable, are formed at the inner end, the series being continued some distance therefrom. These barbs are easily produced when a steel strap is employed by cutting the material obliquely from each edge and bending outwardly the point thus produced.

A suitable handle is provided for convenience in inserting and removing the former and while this handle may take any desired form it is preferably, as shown at 14, integral with the portion 10, the end of the strap being bent back and secured by a rivet to the bowed portion of the device adjacent the point 11 by means of a rivet 15. The extreme end of the portion 14 may be bent outwardly, as shown at 16, to form a stop to prevent the point 11 from tearing entirely through the flesh.

In applying the device to a carcass the point 11 is inserted in the flesh adjacent the edge of the flank and the bowed portion is forced into place by a rolling motion, sufficient pressure being exerted to slightly stretch the flank. On relief of the pressure the tendency of the meat to contract will force the several barbs into the flesh and thus securely hold the former in place. While a plurality of barbs are unobjectionable and in fact desirable, the device is operative when but a single barb is employed. The stretcher and former may be made in a single size and still be used in carcasses varying in size, a smaller number of the barbs coming into service when the animal is small. The portion 14 not only serves as a handle but acts as a brace and permits of the use of a lighter strap or body portion than might otherwise be employed.

While a preferred form of construction is shown, various changes may be made without departing from the scope of the invention.

We claim as our invention:

1. A device of the kind described having a bowed body portion pointed at one end and provided with a barb adjacent its opposite end.

2. A device for stretching and forming the flank portion of the carcass of a hog, consisting of a bar bowed substantially to conform to the natural curvature of the inner surface of the carcass at the flank and having points adjacent both ends.

3. A form adapted to fit within the carcass of a hog at the flank and conforming to the natural curvature of the inner surface thereof and having means for holding it in place therein.

4. A device for stretching and forming the flank portion of the carcass of a hog, consisting of a bar bowed substantially to conform to the natural curvature of the inner surface of the carcass at the flank having points adjacent both ends and a handle.

5. A device for stretching and forming the flank portion of the carcass of a hog comprising a body portion bowed to conform to the natural curvature of the inner surface of the carcass and being pointed at one end, and provided with a series of barbs directed away from the point.

6. A device for stretching and forming the flank portion of the carcass of a hog comprising a body portion bowed to conform to the natural curvature of the inner surface of the carcass and being pointed at one end, provided with a series of barbs directed away from the point, and a bar uniting the two ends of the body portion.

7. A device for stretching and forming the flank portion of the carcass of a hog comprising a body portion bowed to conform to the natural curvature of the inner surface of the carcass and being pointed at one end, and having a stop adjacent the point, and provided with a series of barbs directed away from the point.

8. A device for stretching the flank portion of the carcass of a hog comprising a metal bar having a point at one end and a series of barbs directed oppositely from the named point.

JOHN GOTTLIEB HELMCHEN.
WALTER C. HELMCHEN.

Copies of this patent may be obtained for five cents each, by addressing the "Commissioner of Patents, Washington, D. C."